US008920113B2

(12) United States Patent
Hudson

(10) Patent No.: US 8,920,113 B2
(45) Date of Patent: Dec. 30, 2014

(54) THERMAL GRADIANT TOLERANT TURBOMACHINE COUPLING MEMBER

(75) Inventor: Eric A. Hudson, Harwinton, CT (US)

(73) Assignee: United Technologies Corporation, Hartford, CT (US)

( * ) Notice: Subject to any disclaimer, the term of this patent is extended or adjusted under 35 U.S.C. 154(b) by 491 days.

(21) Appl. No.: 13/304,884

(22) Filed: Nov. 28, 2011

(65) Prior Publication Data

US 2013/0136593 A1 May 30, 2013

(51) Int. Cl.
*F01D 25/00* (2006.01)

(52) U.S. Cl.
USPC ........... 415/134; 415/136; 415/137; 415/142; 415/213.1; 415/214.1

(58) Field of Classification Search
USPC ........... 415/134, 136, 137, 142, 213.1, 214.1, 415/220
See application file for complete search history.

(56) References Cited

U.S. PATENT DOCUMENTS

| | | | | |
|---|---|---|---|---|
| 2,488,867 | A * | 11/1949 | Judson | 415/136 |
| 2,711,074 | A | 6/1955 | Howard | |
| 2,934,316 | A * | 4/1960 | Watson et al. | 415/136 |
| 2,968,922 | A * | 1/1961 | Gilbert | 415/136 |
| 3,028,141 | A * | 4/1962 | Nichols | 415/137 |
| 3,043,564 | A * | 7/1962 | Small, Jr. | 415/137 |
| 3,261,587 | A * | 7/1966 | Rowley | 415/138 |
| 3,408,048 | A * | 10/1968 | Scalzo | 415/136 |
| 3,902,314 | A | 9/1975 | Straniti | |
| 4,304,522 | A * | 12/1981 | Newland | 415/135 |
| 4,558,564 | A * | 12/1985 | Bouiller et al. | 415/134 |
| 4,720,236 | A * | 1/1988 | Stevens | 415/136 |
| 4,793,770 | A | 12/1988 | Schonewald et al. | |
| 4,979,872 | A | 12/1990 | Myers et al. | |
| 7,494,317 | B2 * | 2/2009 | Keller et al. | 415/136 |
| 7,594,405 | B2 | 9/2009 | Somanath et al. | |
| 2007/0071545 | A1 | 3/2007 | Schenk | |
| 2010/0132372 | A1 | 6/2010 | Durocher et al. | |

* cited by examiner

*Primary Examiner* — Igor Kershteyn
(74) *Attorney, Agent, or Firm* — Carlson, Gaskey & Olds, P.C.

(57) ABSTRACT

An exemplary turbomachine securing apparatus includes a coupling member that couples a first component to a second component within a turbomachine. The first component and the second component are both non-rotating components during operation of the turbomachine. The coupling member limiting relative circumferential movement between the first component and the second component, and permitting relative radial movement.

17 Claims, 3 Drawing Sheets

A
36
24
28
10
22
38
44
20
46
30
18
16
28
14

THERMAL GRADIANT TOLERANT TURBOMACHINE COUPLING MEMBER

STATEMENT REGARDING FEDERALLY SPONSORED RESEARCH OR DEVELOPMENT

This invention was made with government support under Contract No. W911W6-08-2-0001 awarded by the United States Army. The Government has certain rights in this invention.

BACKGROUND

This disclosure relates generally to a coupling member and, more particularly, to a Hirth coupling member joining static turbomachine components having dissimilar temperatures, which are also required to have high stiffness, and particularly those with limited packaging space.

Turbomachines include many components. During operation of the turbomachine, some of the components reach very high temperatures. Other components must maintain at lower temperatures. A bearing compartment, for example, must be maintained at or below 400° F. (204° C.) to avoid lubricant contained by the bearing compartment degrading or reaching its flashpoint. Other components in the turbomachine reach temperatures up to 2100° F. (1199° C.) or more.

Joining lower-temperature components, such as the bearing compartment, to other components that reach higher temperatures is often difficult. The higher-temperature components grow more than the lower-temperature components, which strains one or both of the components. The strain is particularly prevalent in turboshaft and small-core commercial gas turbine engines as these engines provide very little space to accommodate a high thermal gradient between components.

Coupling strategies for components must accommodate the strain resulting from the thermal gradients described above. Introducing flexibility to the coupling strategy would help, but turbomachines typically require highly rigid connections, especially between the bearing compartment and the outer structure of the engine to control lateral deflection and critical speeds of the rotating components. The coupling must also provide very tight concentricity control between the two components to maintain engine bearing alignment and close clearances between rotating and static components. The inherent conflict between these requirements can drive significant compromise into the overall engine design.

SUMMARY

An exemplary turbomachine securing apparatus includes a coupling member that couples a first component to a second component within a turbomachine. The first component and the second component are both non-rotating components during operation of the turbomachine. This coupling concept limits relative axial and circumferential movement between the first component and the second component, while permitting relative differential thermal growth and maintaining high radial stiffness and tight concentricity between the two components, for example.

In one specific example, close tolerance, matched radial coupling teeth on each component to be joined (sometimes known as Hirth teeth) can satisfy the conflicting stiffness, concentricity and differential thermal growth requirements. Two-piece Hirth couplings have been historically used for purposes of joining turbomachinery rotating structures, as well as other shafting applications, for the purposes of transmitting high torque and maintaining concentricity for a series of rotors assembled into a high-precision stack. While static turbomachinery joints do not have a high torque transmission requirement, other attributes of the Hirth couplings provide the benefits as described above when applied to static turbomachinery couplings.

An exemplary turbomachine coupling arrangement includes a bearing compartment of a turbomachine, and a strut member of the turbomachine, which provides the connection between the outer case structure and the bearing compartment. The strut must pass through the high temperature gaspath environment to provide this connection. The bearing compartment has a plurality of bearing compartment Hirth teeth. The strut member has a plurality of strut member Hirth teeth. A Hirth coupling member establishes a plurality of mating Hirth grooves. Each of these Hirth grooves receives one of the bearing compartment Hirth teeth and one of the strut member Hirth teeth.

An exemplary method of securing non-rotating components of a turbomachine includes receiving a first Hirth tooth of a first component within a groove of a Hirth coupling member and receiving a second Hirth tooth of a second component within the groove.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
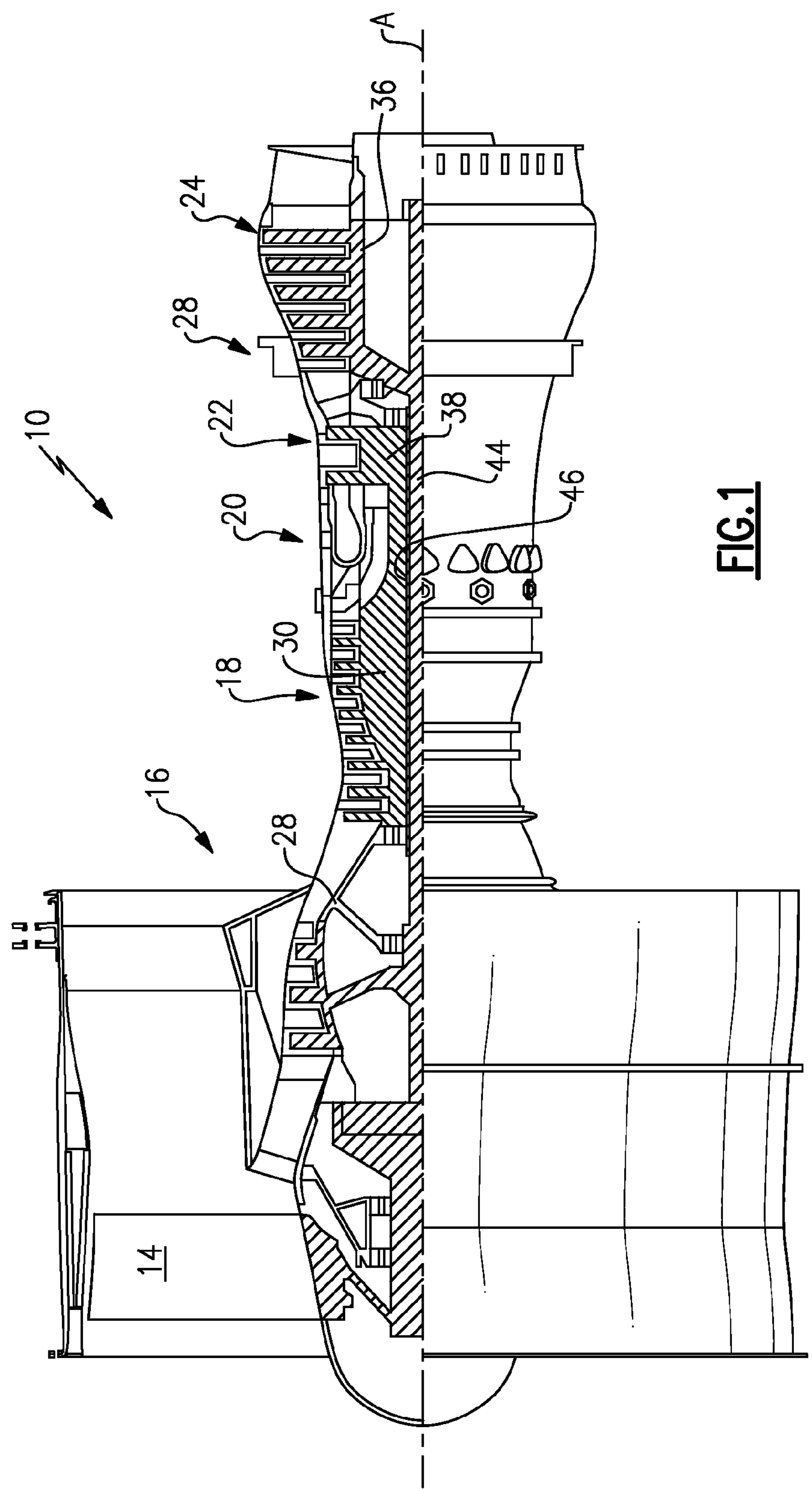
FIG. 1 shows a sectional view of an example turbomachine.
Figure 2:
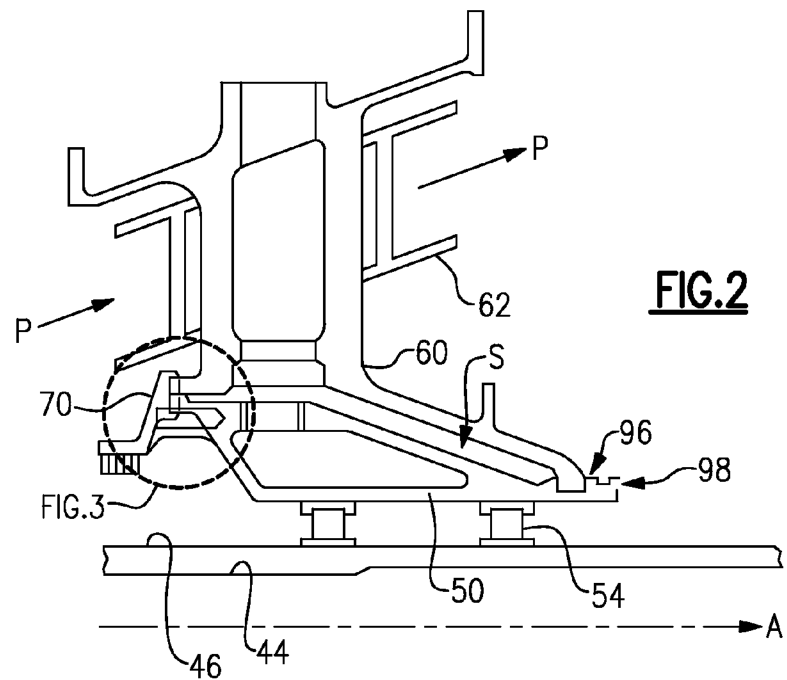
FIG. 2 shows a close-up view of a portion of the FIG. 1 turbomachine.
Figure 3:
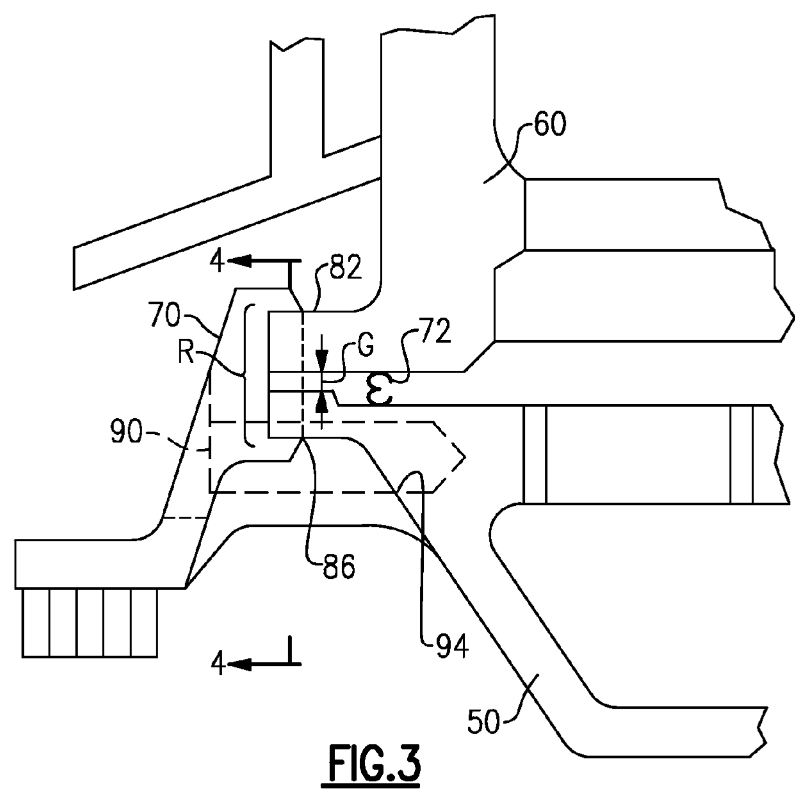
FIG. 3 shows a close-up view of area 3 in FIG. 2.
Figure 4:
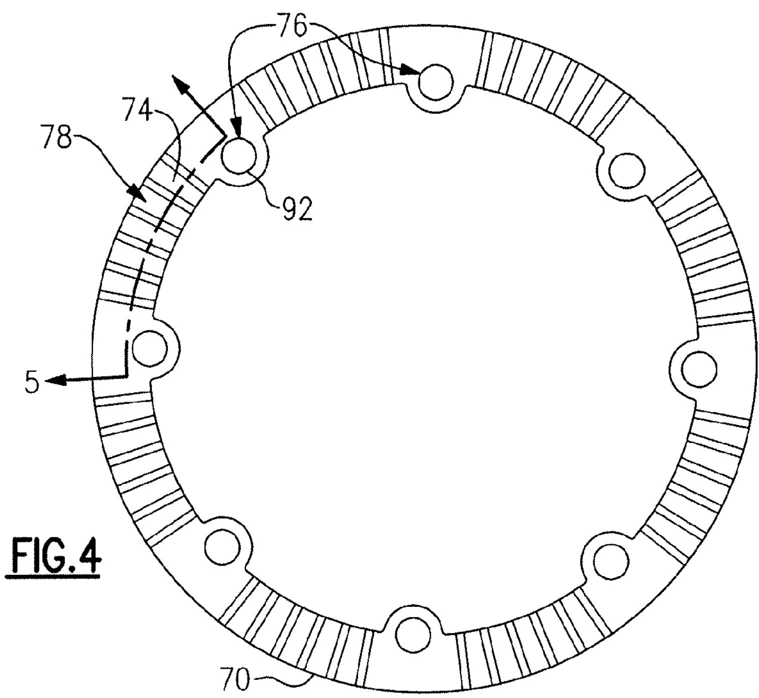
FIG. 4 shows an end view of a Hirth coupling member shown at line 4-4 in FIG. 3.
Figure 5:
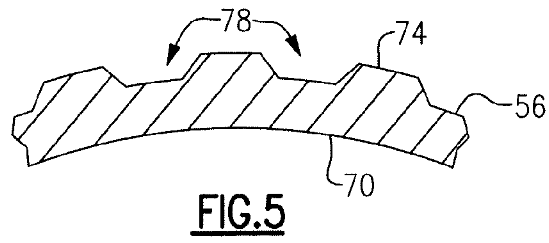
FIG. 5 shows a section view at line 5-5 in FIG. 4.

Referring to FIG. 1, an example turbomachine, such as a gas turbine engine 10, is circumferentially disposed about an axis A. The gas turbine engine 10 includes a fan 14, a low-pressure compressor section 16, a high-pressure compressor section 18, a combustion section 20, a high-pressure turbine section 22, and a low-pressure turbine section 24. Other example turbomachines may include more or fewer sections.

During operation, air is compressed in the low-pressure compressor section 16 and the high-pressure compressor section 18. The compressed air is then mixed with fuel and burned in the combustion section 20. The products of combustion are expanded across the high-pressure turbine section 22 and the low-pressure turbine section 24.

The low-pressure compressor section 16 and the high-pressure compressor section 18 include rotors 28 and 30, respectively. The high-pressure turbine section 22 and the low-pressure turbine section 24 each include rotors 36 and 38, respectively. The rotors 36 and 38 rotate in response to the expansion to rotatably drive the high-pressure compressor section 18 and the low-pressure compressor section 16.

The rotor 36 is coupled to the rotor 28 with a spool 44, and the rotor 38 is coupled to the rotor 30 with a spool 46. Bearings rotatably support the spools 44 and 46 during operation of the gas turbine engine 10.

The examples described in this disclosure are not limited to the two-spool gas turbine architecture described, however, and may be used in other architectures, such as the single-spool axial design, a three-spool axial design, and still other architectures. That is, there are various types of gas turbine engines, and other turbomachines, that can benefit from the examples disclosed herein.

Referring to FIG. 2-5 with continuing reference to FIG. 1, the gas turbine engine 10 includes a bearing compartment 50 near the turbine sections 22 and 24. The bearing compartment 50 houses roller bearings 54 that rotatably support the first spool 44, the second spool 46, or both.

As is known, lubricant moving through the bearing compartment 50 cools and lubricates the bearings 54 during operation of the gas turbine engine 10. In this example, the bearing compartment 50 stays below 400° F. (204.44° C.) so the contained lubricant does not degrade or reach its flash-point.

A strut assembly 60 is located radially outside the bearing compartment 50 relative to the axis A of the gas turbine engine 10. The strut 60 may be shielded from direct gaspath exposure by a fairing structure 62. The fairing structure 62 establishes a flow path P through the gas turbine engine 10. The strut 60 extends across the flow path P.

The fluid moving through the gas turbine engine 10 along the flow path P heats the fairing 62 and the strut 60. In one example, the temperature of the fairing 62 reaches 1800° F. (982.22° C.) during operation, and the strut 60 reaches 800° F. (426.66° C.). Other arrangements are possible which do not include a gaspath fairing.

In this example, the bearing compartment 50 is secured to the strut 60 to hold the bearing compartment 50 within the gas turbine engine 10. The example strut 60 is considered to form a portion of a mid-turbine frame that supports the bearing compartment 50 within the inter-turbine gas path areas of the gas turbine engine 10.

A Hirth coupling member helps join the bearing compartment 50 to the strut 60. The example coupling member is a Hirth coupling member 70 that accommodates relative dimensional changes between the strut 60 and the bearing compartment 50, while still maintaining the coupled relationship between the strut 60 and the bearing compartment 50. The relative dimensional changes are due to the strut 60 reaching a much higher temperature that the bearing compartment during operation of the gas turbine engine 10.

Although described in this example as the Hirth coupling member 70, other examples may include types or variations of precision axially tapered radial spline couplings that do not include a Hirth coupling.

The example Hirth coupling member 70 is an annular ring. A plurality of Hirth teeth 74 extend axially from a face 56 of the Hirth coupling member 70. Circumferential spaces between adjacent ones of the Hirth teeth 74 are Hirth grooves 78.

In this example, when the bearing compartment 50 is coupled to the strut 60, each of the Hirth grooves 78 receives a portion of the strut 60 and a portion of the bearing compartment 50. More specifically, each of the Hirth grooves 78 receives a Hirth tooth portion 82 of the strut 60 and a Hirth tooth portion 86 of the bearing compartment 50.

In this example, the Hirth grooves 78 have a radial length R. The Hirth tooth portions 82 and 86 each have a radial length that less than or equal to R/2. Also, the Hirth tooth portion 86 of the bearing compartment 50 is radially closer to the axis A than the Hirth tooth portion 82 of the strut 60.

Positioning both the Hirth tooth 82 and the Hirth tooth 86 within one of the Hirth grooves 78 limits circumferential movement of the strut 60 relative to the bearing compartment 50 about the axis A. The concentricity of the strut 60 and the bearing compartment 50 is thus maintained.

When coupled, the Hirth tooth 82 and the Hirth tooth 86 are able to expand and contract radially relative to each other while maintaining a coupled relationship. The Hirth tooth 82 and the Hirth tooth 86 expand and contract radially relative to each other within one of the Hirth grooves 78.

Although the example coupling member uses Hirth grooves 78 and Hirth teeth 74 to engage with the Hirth teeth 82 and the Hirth teeth 865, these features are not required. Other example coupling members include other features that limit circumferential movement while permitting some radial differential growth.

To hold the Hirth tooth 82 and the Hirth tooth 86 within one of the Hirth grooves 78, a mechanical fastener 90 is received an aperture 92 of the Hirth coupling member 70. The mechanical fastener 90 is then secured within an opening 94 of the bearing compartment 50. The example mechanical fastener 90 threadably engages the bearing compartment 50. That is, both the mechanical fastener 90 and the opening 94 are threaded.

In this example, the mechanical fastener 90 is always under tension when securing the Hirth coupling member. Tensioning the mechanical fastener 90 in this manner ensures that the mechanical fastener 90 can accommodate the total range of temperatures for these components associated with the gas turbine engine 10 operation.

In this example, the apertures 92 that receive the mechanical fastener 90 are radially overlapped with a portion of the Hirth grooves 78 and the Hirth teeth 74. That is, the Hirth grooves 78 and the Hirth teeth 74 extend radially past a portion of the aperture 92.

The example Hirth coupling member 70 includes the Hirth teeth 74 distributed about the entire circumference. Slight interruptions 76 are positioned between groups of the Hirth teeth 74.

A full circumferential distribution of the Hirth teeth 74 is not required, however. For example, another Hirth coupling member 70 may include groups of the Hirth teeth only at the 12:00, 4:00, and 8:00 positions.

Hirth teeth 74 are used in this example. Other examples may use radial pins in place of the Hirth teeth 74. Still other examples may use radial splines in place of the Hirth teeth 74.

The Hirth coupling member 70 may be a portion of a buffer seal, or another existing part.

When the Hirth coupling member 70 joins the bearing compartment 50 and the strut 60, the three components form a box structure with an axial wheelbase to resist bending during maneuvers of the gas turbine engine 10 during flight.

To secure Hirth coupling member 70 over the range of operating conditions associated with the gas turbine engine 10, the example mechanical fastener 90 is tensioned. In another example, a wave washer (not shown) is biased against the Hirth coupling member 70. The wave washer limits relative movement between the Hirth coupling member 70, the bearing compartment 50 and the strut 60. Still other examples may utilize a spring or other flexible element in place of the wave washer.

In this example, a radial gap G is established between the strut 60 and the bearing compartment 50 when these components are coupled. The gap G accommodates thermal growth differentials between the bearing compartment 50 and the strut 60. In one example, the gap G is from 0.010 to 0.012 inches (0.25 to 0.31 millimeters).

In this example, an E-seal 72 is used to block the leakage path through the gap G. The E-seal 72, in this example, accommodates zero axial and about 0.008 inches (0.20 mm) radial cyclic deflection. The example E-seal 72 is an axi-symmetric seal with an open side and an undulation providing flexibility to accommodate limited relative deflection present between the two components to be sealed. Differential pressure loads press the E-seal against the adjoining surfaces. Variations include greater or lesser numbers of undulations to increase or decrease the axial preload and deflection range of the seal.

In some examples, other seal elements are used in place of the E-seal 72, such as a sheet metal flexible seal or a rope seal.

A secondary flow path S is established between the bearing compartment 50 and the strut 60. The path S is used to communicate air used to cool rotors of the gas turbine engine 10.

A spanner nut and snap connection 96 joins the bearing compartment 50 the strut 60 at an axial end 98 opposite the Hirth coupling member 70. This other connection 96 forms a rigid "box" structure which will resist moments applied to the overall joint while including a conical structure to provide thermal isolation and lateral flexibility on the second side where packaging space permits it. Other examples may not require a parallel connection, or may join the components at the axial end 98 using a flange or weld, a second Hirth coupling or other suitable mechanical method.

The subject turbomachine securing arrangement utilizes one Hirth coupling member. Other examples may use more than one Hirth coupling member.

Figure 6:
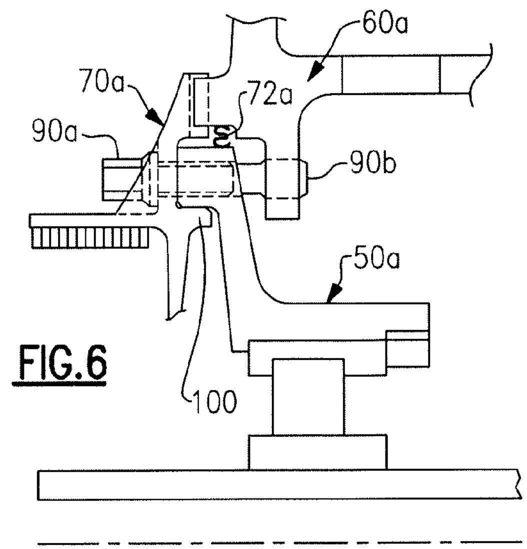
FIG. 6 shows an alternative coupling arrangement for use in the FIG. 1 turbomachine.

Still other examples may use a two-element joint without a separate coupling member. FIG. 6 shows one such variation where a bearing compartment 50*a* is secured to a strut 60*a* with a Hirth coupling member 70*a* and mechanical fastener 90*a* and 90*b*. The mechanical fastener 90*a* couples the Hirth coupling member 70*a* to the bearing compartment 50*a*. The mechanical fastener 90*b* couples the strut 60*a* to the bearing compartment 50*a* and the Hirth coupling member 70*a*. The mechanical fasteners 90*a* and 90*b* are at the same radial location and alternate circumferentially about the axis.

In this example, a piloted flange 100, limits substantial radial movements of the bearing compartment 50*a* relative to the coupling member 70*a*. The two-piece Hirth coupling functions as described above to allow differential thermal growth between the assembly of the bearing compartment 50*a* and the coupling member 70*a* and the strut 60*a*. In this example, an E-seal 72*a* is used to contain cooling air similar to other examples described above. Other designs may not require cooling air sealing at this location.

Features of the disclosed examples include turbomachine securing arrangement including a coupling that accommodates radial movement of a strut relative to a bearing compartment while still providing a high lateral stiffness coupling arrangement. In one example, the turbomachine securing arrangement provides a solid mechanical load transfer between a relatively hot support and a relatively cold bearing housing while allowing relative thermal deflection between the two parts. The example Hirth coupling provides rigid axial and lateral support.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A turbomachine securing apparatus, comprising:

a coupling member that couples a first component to a second component within a turbomachine, the first component and the second component are both non-rotating components during operation of the turbomachine, wherein the coupling member limits relative circumferential movement between the first component and second component and permits relative radial movement, wherein the first component comprises a bearing compartment.

2. The turbomachine coupling apparatus of claim 1, wherein the second component comprises a housing connected to one or more struts extending radially across a flow path of the turbomachine.

3. The turbomachine coupling apparatus of claim 1, wherein the coupling member is a Hirth coupling member that includes a plurality of Hirth teeth receivable within a plurality of Hirth grooves, the first component and the second component each establishing a portion of the plurality of Hirth grooves.

4. The turbomachine coupling apparatus of claim 3, wherein the first component establishes a radially inner portion of the Hirth grooves, and the second component establishes a radially outer portion of the Hirth grooves.

5. The turbomachine coupling apparatus of claim 3, wherein the Hirth teeth have radially-extending, planar sides.

6. The turbomachine coupling apparatus of claim 3, including a mechanical fastener that holds the Hirth teeth within the Hirth grooves.

7. The turbomachine coupling apparatus of claim 1, wherein the coupling member is annular.

8. The turbomachine coupling apparatus of claim 1, wherein the coupling member maintains concentricity between the first and second components.

9. The turbomachine coupling apparatus of claim 1, wherein the relative radial movement is relative radial expansion and contraction.

10. A turbomachine coupling arrangement, comprising:

a bearing compartment of a turbomachine, the bearing compartment having a plurality of bearing compartment Hirth teeth;

a housing connected to at least one strut member of the turbomachine, the strut member having a plurality of strut member Hirth teeth; and a Hirth coupling member establishing a plurality of Hirth grooves, each of the Hirth grooves receives one of bearing compartment Hirth teeth and one of the strut member Hirth teeth.

11. The turbomachine coupling arrangement of claim 10, wherein the bearing compartment Hirth teeth are radially closer to an axis of the turbomachine than the strut member Hirth teeth.

12. The turbomachine coupling arrangement of claim 10, wherein the Hirth coupling member is annular.

13. The turbomachine coupling arrangement of claim 10, wherein the bearing compartment Hirth teeth and the strut member Hirth teeth face axially in the same direction.

14. The turbomachine coupling arrangement of claim 10, wherein the bearing compartment, the strut member, and the Hirth coupling member are nonrotating during operation of the turbomachine.

15. A method of securing nonrotating components of a turbomachine, comprising:

receiving a first Hirth tooth of a first component within a groove of a Hirth coupling member; and receiving a second Hirth tooth of a second component within the groove, the second component comprising a housing connected to one or more struts extending radially across a flow path of the turbomachine.

16. The method of claim 15 including maintaining a position of the Hirth coupling member when rotating a shaft of a turbomachine.

17. The method of claim 15, wherein the first component comprises a bearing compartment.

* * * * *